United States Patent
Harigai et al.

(10) Patent No.: US 11,080,818 B2
(45) Date of Patent: Aug. 3, 2021

(54) IMAGE DISPLAY APPARATUS AND NON-TRANSITORY COMPUTER READABLE MEDIUM STORING IMAGE DISPLAY PROGRAM FOR DEFORMING A DISPLAY TARGET

(71) Applicant: FUJIFILM Business Innovation Corp., Tokyo (JP)

(72) Inventors: Jungo Harigai, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/726,197

(22) Filed: Dec. 23, 2019

(65) Prior Publication Data
US 2020/0380637 A1 Dec. 3, 2020

(30) Foreign Application Priority Data
May 29, 2019 (JP) .............................. JP2019-100676

(51) Int. Cl.
| | |
|---|---|
| *G06T 3/00* | (2006.01) |
| *G06F 3/0484* | (2013.01) |
| *G06T 11/00* | (2006.01) |
| *G06T 3/40* | (2006.01) |
| *G06F 3/0488* | (2013.01) |

(52) U.S. Cl.
CPC .......... *G06T 3/0093* (2013.01); *G06F 3/0488* (2013.01); *G06F 3/04845* (2013.01); *G06T 3/40* (2013.01); *G06T 11/001* (2013.01)

(58) Field of Classification Search
CPC ....... G06T 3/0093; G06T 3/40; G06T 11/001; G06F 3/0488; G06F 3/04845; G06F 2203/04808; G06F 3/04842
See application file for complete search history.

(56) References Cited

U.S. PATENT DOCUMENTS

| | | | | |
|---|---|---|---|---|
| 2005/0010326 A1* | 1/2005 | Hayward | ............... | G06F 30/23 700/182 |
| 2012/0317510 A1 | 12/2012 | Noda et al. | | |
| 2013/0110482 A1* | 5/2013 | Ellens | .................... | G06F 30/20 703/6 |

(Continued)

FOREIGN PATENT DOCUMENTS

| | | |
|---|---|---|
| JP | 2000-235589 | 8/2000 |
| JP | 2012-256110 | 12/2012 |

OTHER PUBLICATIONS

Orzechowski, "Pinching sweaters on your phone-iShoogle: multi-gesture touchscreen fabric simulator using natural on-fabric gestures to communicate textile qualities", Heriot-Watt University, Edinburgh School of Mathematics and Computer Sciences, May 2016 (Year: 2016).*

(Continued)

*Primary Examiner* — Maurice L. McDowell, Jr.
(74) *Attorney, Agent, or Firm* — JCIPRNET

(57) ABSTRACT

An image display apparatus includes a display screen that displays an image indicative of an object as a display target, and a control unit that performs control to change content of deforming the display target according to the number of contacts with respect to the display screen and a vector in which contact positions based on the contacts are moved.

20 Claims, 8 Drawing Sheets

(56) References Cited

U.S. PATENT DOCUMENTS

| | | | | |
|---|---|---|---|---|
| 2013/0187930 A1* | 7/2013 | Millman | ............... | G06F 30/23 |
| | | | | 345/473 |
| 2013/0268847 A1* | 10/2013 | Kim | ................ | G06F 3/0483 |
| | | | | 715/251 |
| 2014/0046469 A1* | 2/2014 | Bickel | ................ | B29C 64/386 |
| | | | | 700/106 |
| 2014/0059457 A1* | 2/2014 | Min | ................ | G06F 3/0484 |
| | | | | 715/764 |
| 2016/0224861 A1* | 8/2016 | Vogh, Jr. | ............ | G06K 9/4661 |
| 2016/0328115 A1 | 11/2016 | Noda et al. | | |
| 2016/0357395 A1* | 12/2016 | Takamura | ........ | G06F 3/04845 |
| 2018/0047094 A1* | 2/2018 | Lucido | ................ | G06F 3/014 |
| 2019/0163272 A1* | 5/2019 | Khare | ................ | G06F 3/016 |

OTHER PUBLICATIONS

Toh, "Interactive Cloth Manipulation With Multi-Touch Control", Carnegie Mellon University, Stickfingers.pdf, Dec. 25, 2010, pp. 1-9. (Year: 2010).*

* cited by examiner

IMAGE DISPLAY APPARATUS AND NON-TRANSITORY COMPUTER READABLE MEDIUM STORING IMAGE DISPLAY PROGRAM FOR DEFORMING A DISPLAY TARGET

CROSS-REFERENCE TO RELATED APPLICATIONS

This application is based on and claims priority under 35 USC 119 from Japanese Patent Application No. 2019-100676 filed May 29, 2019.

BACKGROUND

(i) Technical Field

The present invention relates to an image display apparatus and a non-transitory computer readable medium storing an image display program.

(ii) Related Art

JP2012-256110A discloses an information processing apparatus including a detection unit that detects a pinch operation of a user, and a control unit that determines a stereoscopic object as a selection target in a case where a pinch position based on the detected pinch operation corresponds to a perceived position of the stereoscopic object by the user.

SUMMARY

In above technology, a motion of two fingers only corresponds to a pinch operation, and it is not possible to perform the pinch operation which is unambiguously determined.

Aspects of non-limiting embodiments of the present disclosure relate to an image display apparatus and a non-transitory computer readable medium storing an image display program that enable various operations to be performed on an image (display target) of an object displayed on a display screen, compared to a case where a pinch operation which is unambiguously determined by the motion of two fingers is performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image display apparatus including a display screen that displays an image indicative of an object as a display target; and a control unit that performs control to change content of deforming the display target according to the number of contacts with respect to the display screen and a vector in which contact positions based on the contacts are moved.

BRIEF DESCRIPTION OF THE DRAWINGS

Exemplary embodiment(s) of the present invention will be described in detail based on the following figures, wherein.

DETAILED DESCRIPTION

First Exemplary Embodiment

Hereinafter, examples of forms for performing a technology according to exemplary embodiments of the present invention will be described in detail with reference to the accompanying drawings. Meanwhile, an image display apparatus according to an exemplary embodiment includes a touch panel mounted with a touch sensor on a screen for displaying an image, and the touch panel detects coordinates of positions which are in contact with the screen (hereinafter, referred to as "contact positions"). In addition, the image display apparatus derives a velocity and a direction, in which the contact positions move (hereinafter, referred to as a "contact vector"), using the detected coordinates. In the exemplary embodiment, a form will be described in which the image display apparatus deforms the image according to contacts that are input by being contact with the screen. However, the image display apparatus is not limited thereto. The image display apparatus may have a form which deforms the image according to information which is input from at least any one of a keyboard or a mouse.

Figure 1:
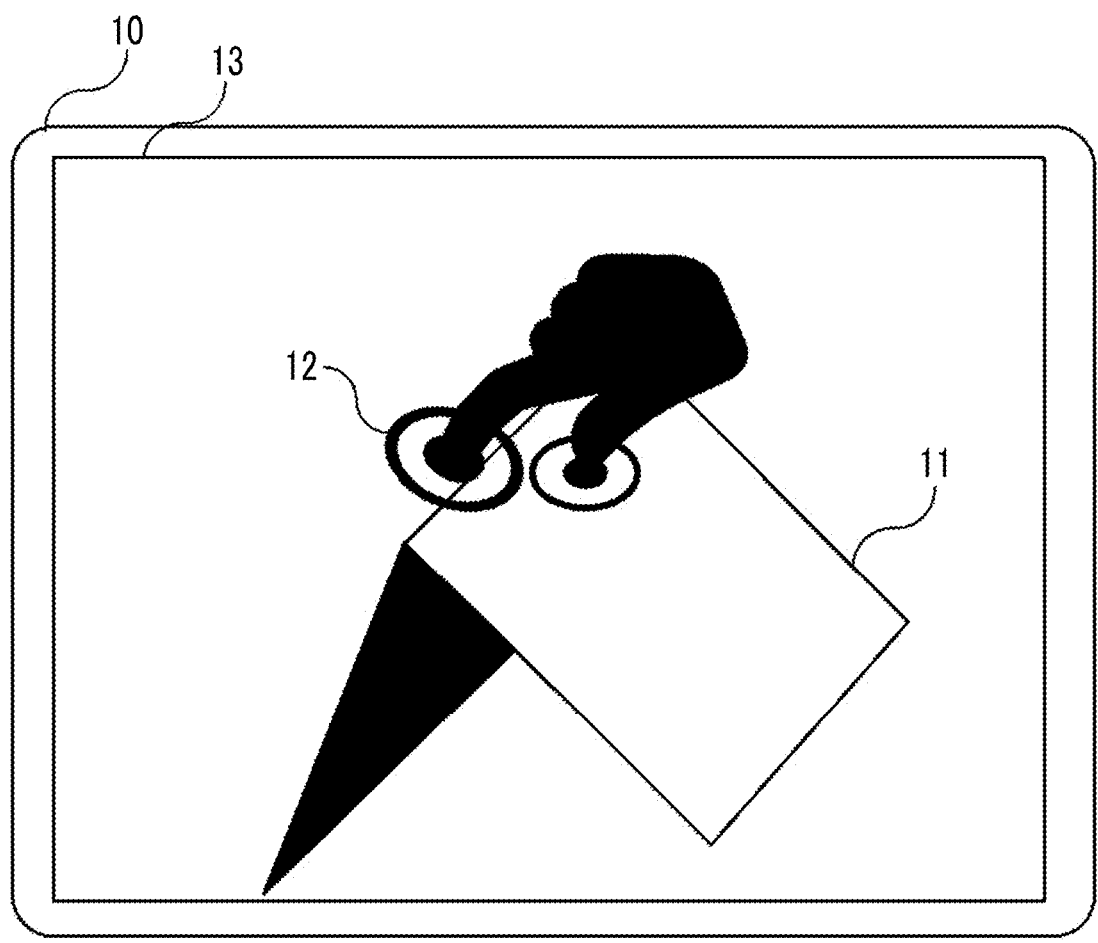
FIG. 1 is a schematic diagram schematically illustrating an example of an image display apparatus according to each exemplary embodiment.

FIG. 1 is a schematic diagram schematically illustrating an example of an image display apparatus 10 according to each exemplary embodiment. The image display apparatus 10 includes a touch panel 13, which displays an image of an object (hereinafter, referred to as "display target") 11 and detects contact positions 12.

The image display apparatus 10 according to the exemplary embodiment deforms the display target 11 according to the coordinates of the contact positions 12, which are in contact with the touch panel 13, the contact vector, and a distance between the respective contact positions (hereinafter, referred to as "contact distance"), and displays the display target 11 on the touch panel 13. As an example, as illustrated in FIG. 1, in a case where the contact distance is decreased to pinch the display target 11 displayed on the touch panel 13, the image display apparatus 10 deforms the display target 11 to a bent shape, and displays the display target 11 on the touch panel 13.

Meanwhile, a form will be described in which the image display apparatus 10 according to the exemplary embodiment includes the touch panel 13. However, the form is not limited thereto. A form may be provided in which an input with respect to the touch panel 13 is transmitted to the image display apparatus 10 installed in a separated location and a process is performed.

Figure 2:
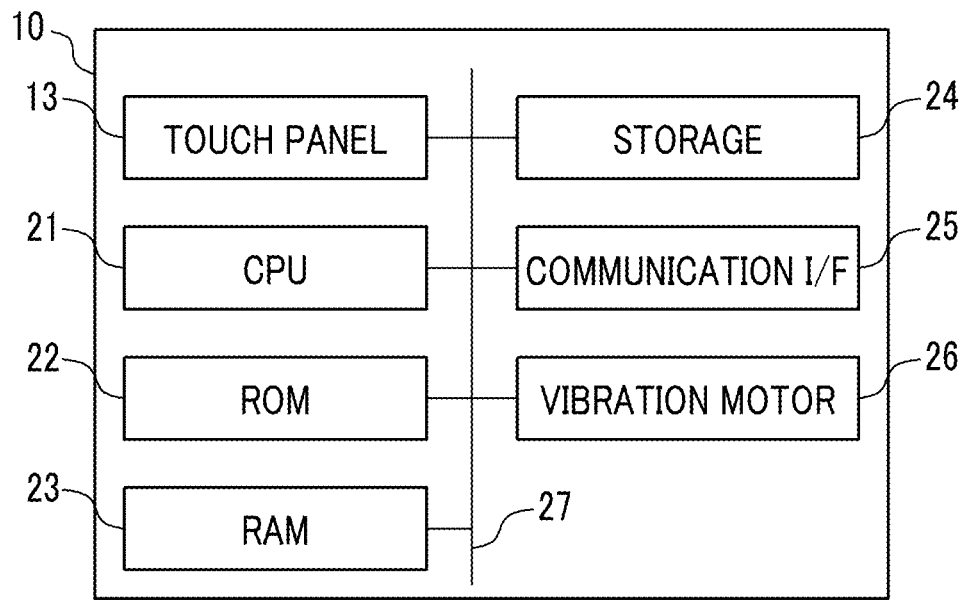
FIG. 2 is a block diagram illustrating an example of a hardware configuration of the image display apparatus according to each exemplary embodiment.

FIG. 2 is a block diagram illustrating an example of a hardware configuration of the image display apparatus 10 according to the exemplary embodiment. As illustrated in FIG. 2, the image display apparatus 10 according to the exemplary embodiment includes the touch panel 13, a Central Processing Unit (CPU) 21, a Read Only Memory (ROM) 22, a Random Access Memory (RAM) 23, a storage 24, a communication interface (communication I/F) 25, and a vibration motor 26. The touch panel 13, the CPU 21, the ROM 22, the RAM 23, the storage 24, the communication I/F 25, and the vibration motor 26 are respectively connected to each other through a bus 27. In addition, the image display apparatus 10 includes a not-shown Graphics Processing Unit (GPU) which asynchronously performs processes (a spatial region conversion process, an image compression process, and the like) relevant to image processing with the CPU 21 according to a command received from the CPU 21.

The touch panel 13 detects a position which is in contact with the screen, and displays an image. Meanwhile, the touch panel 13 may be any apparatus in a case where it is possible to detect the contact positions and to display the image. For example, the touch panel 13 may be a capacitance-type touch panel or a resistance film-type touch panel.

The CPU 21 integrates an entirety of the image display apparatus 10 and performs control. The ROM 22 stores various programs, which include an image display program used in the exemplary embodiment, data, and the like. The RAM 23 is a memory which is used as a work area in a case where the various programs are executed. The CPU 21 deforms the display target 11 and displays the display target 11 by deploying and executing the programs, which are stored in the ROM 22, in the RAM 23. As an example, the storage 24 includes a Hard Disk Drive (HDD), a Solid State Drive (SSD), a flash memory, and the like. Meanwhile, an image display program or the like may be stored in the storage 24. The communication I/F 25 transmits and receives the data. The vibration motor 26 vibrates the image display apparatus 10 by performing an operation.

Figure 3:
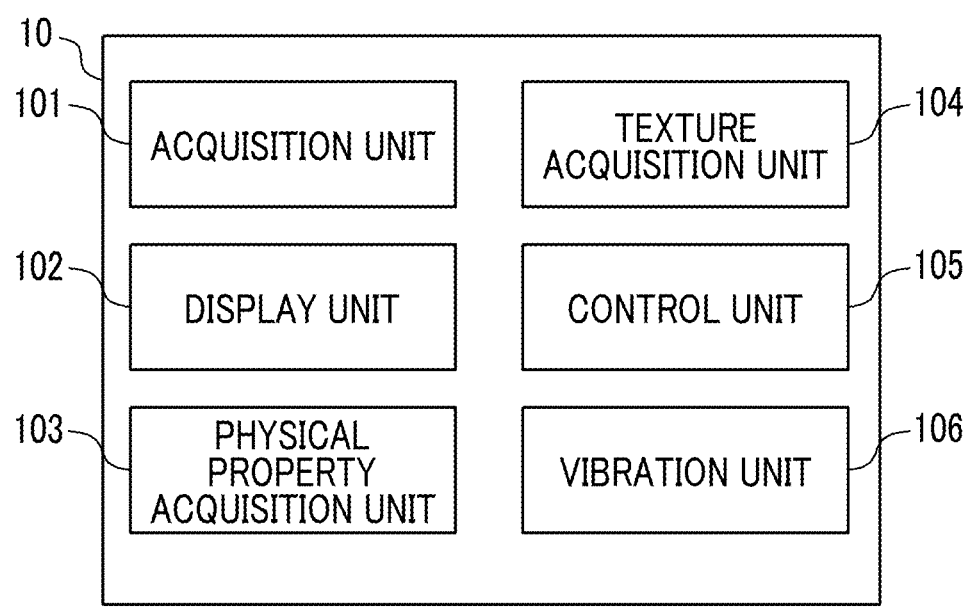
FIG. 3 is a block diagram illustrating an example of a functional configuration of the image display apparatus according to each exemplary embodiment.

Subsequently, a functional configuration of the image display apparatus 10 will be described. FIG. 3 is a block diagram illustrating the functional configuration of the image display apparatus 10 according to the exemplary embodiment.

As illustrated in FIG. 3, the image display apparatus 10 includes an acquisition unit 101, a display unit 102, a physical property acquisition unit 103, a texture acquisition unit 104, a control unit 105, and a vibration unit 106. In a case where the CPU 21 executes the image display program, the CPU 21 functions as the acquisition unit 101, the display unit 102, the physical property acquisition unit 103, the texture acquisition unit 104, the control unit 105, and the vibration unit 106.

The acquisition unit 101 acquires the coordinates of the contact positions 12 which are in contact with the touch panel 13, the number of contact positions 12, the contact vector, the contact distance (hereinafter, referred to as "contact information"), and the like. The display unit 102 displays the display target 11 on the touch panel 13.

The physical property acquisition unit 103 acquires information relevant to physical properties of an object indicated by the display target 11. In the exemplary embodiment, as an example, a form will be described in which the physical properties include elasticity and a gloss. However, the form is not limited thereto. For example, a form may be provided in which the physical properties include at least one of a substance property, such as a weight, a density, or a gravity, a tension property, a bending property, a shear property, or a compression property, or a form may be provided in which the physical properties include the amount of physical properties such as a rigidity modulus, a Young's modulus, or a permittivity.

The texture acquisition unit 104 acquires information relevant to texture, which is one of the physical properties, of a surface of the display target 11 (hereinafter, referred to as "texture information"). The texture information includes, for example, coordinates corresponding to unevenness and a step of the surface of the display target 11, the gloss indicative of a reflection degree of light, and the elasticity indicative of softness of the object, and the like. In the exemplary embodiment, a form will be described in which the elasticity is acquired as the texture information.

The control unit 105 performs a control to change content for deforming the display target 11 according to the number of contacts with respect to the display screen and a vector in which the contact positions based on the contacts are moved. The control unit 105 performs the control by, for example, the following aspect.

In a case where the number of contacts with respect to the display screen is equal to or larger than two and the contact positions are moved such that the distance between the contact positions based on the two or more contacts is decreased or increased, the control unit 105 deforms the display target 11 about a part in an area surrounded by the two or more contacts. In addition, in a case where the contact positions are moved such that the distance between the contact positions based on the two or more contacts is decreased, the control unit 105 deforms the display target 11 by causing the image to come near to a prescribed place in the area such that the display target 11 is pinched in the area surrounded by the two or more contacts. In addition, in a case where the contact positions are moved such that the distance between the contact positions based on the two or more contacts is expanded, the control unit 105 deforms the display target by expanding the image from the area such that the display target is spread out in the area surrounded by the places whose number is equal to or larger than 2.

In addition, in a case where a plurality of contact positions based on a plurality of contacts are moved in a first direction which is an identical direction, the control unit 105 deforms the display target 11 such that an area surrounded by the plurality of contact positions slides toward an end part of the display target 11 which exists at a front side of the first direction.

In addition, the control unit 105 changes a method for deforming the display target 11 according to the physical properties of the object. In addition, the control unit 105 changes the amount of deformation of the display target 11 according to the physical properties. In addition, the control unit 105 changes a deformation velocity in a case where the display target is deformed according to the physical properties. In addition, the control unit 105 changes the display target in different forms according to the physical properties.

In addition, the higher the elasticity of the display target 11, the control unit 105 causes a velocity of returning to an original shape to be faster after the display target 11 is deformed. In addition, the higher glossiness of the display target 11, the control unit 105 causes the amount of change in the reflection degree of light to be larger in a case where the display target is deformed. In addition, the control unit 105 changes the reflection degree after the display target 11 is deformed. In addition, according to the texture, the control unit 105 changes a behavior in a case where the display target 11 is deformed.

The vibration unit 106 drives the vibration motor 26 in a case of being pinched or in a case where the unevenness is large.

Subsequently, before an action of the image display apparatus 10 is described, an image deformation method performed by the image display apparatus 10 will be described with reference to FIGS. 4, 5, 6, and 7. In the exemplary embodiment, a form will be described in which the method for deforming the display target 11 is changed according to a value of the elasticity (hereinafter, referred to as an "elasticity value") predetermined for each display target 11. Meanwhile, the deformation according to the exemplary embodiment indicates a change in a shape of the display target 11. The deformation indicates, for example, a fact that the display target 11 is wrinkled as in a case where the display target 11 is deflected, is bent, is folded, is pinched, and is held, and a fact that the display target 11 is unwrinkled as in a case where the display target 11 is spread out. In addition, as an example, a form will be described in which the elasticity value is a Young's modulus indicative of a relationship between a spring constant used in the Hooke's law, a bending stress applied to the object, and distortion.

Figure 4:
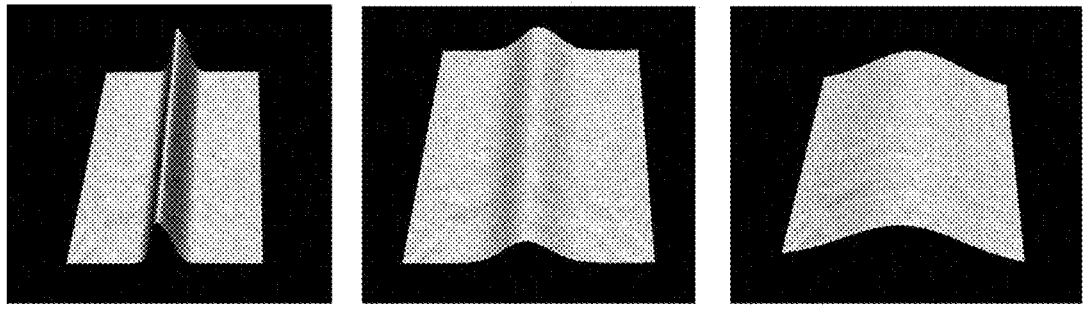
FIG. 4 is an outline diagram illustrating an example of an image display process provided for description in which the display target according to the exemplary embodiment is deformed to be bent.

First, a case where the object is deformed to be bent will be described with reference to FIG. 4. FIG. 4 is an outline diagram illustrating an example of an image display process provided for description in which the display target according to the exemplary embodiment is deformed to be bent. Specifically, FIG. 4 illustrates an example in which force acts with respect to the display target 11 from both sides toward a center, such that the display target 11 is deformed to be bent along a line which passes through the center.

The control unit 105 calculates a buckling load of the display target 11 based on the elasticity value. In a case where the buckling load of the display target 11 is larger than a threshold of a predetermined buckling load (hereinafter, referred to as a "load threshold"), the image display apparatus 10 deforms the display target 11 to be bent and displays the bent display target 11. Meanwhile, the buckling load according to the exemplary embodiment is a load (power) applied to the object in a case where a buckling phenomenon (for example, large deformation as in a case where a stick is broken) is caused, and the buckling load is decided by a length, a cross-sectional area, a material, and the like of the object.

A left view of FIG. 4 expresses that the display target 11 is soft as paper, a central view of FIG. 4 expresses that the display target 11 has a certain degree of firmness (intermediate elasticity between the paper and a plate) as a silk cloth, and a right view of FIG. 4 expresses that the display target 11 has firmness having elasticity as a thin plate.

The image display apparatus 10 deforms the display target 11 as illustrated in FIG. 4 using the buckling load calculated based on the elasticity value which is set to the display target 11. For example, in a case where the buckling load is equal to or larger than a first load threshold and is smaller than a second load threshold which is larger than the first load threshold, the image display apparatus 10 deforms the display target 11 as the paper (the left view of FIG. 4). In a case where the buckling load is smaller than a third load threshold which is larger than the second load threshold, the image display apparatus 10 deforms the display target 11 as the silk cloth (the central view of FIG. 4). In a case where the buckling load is larger than the third load threshold, the image display apparatus 10 deforms the display target 11 as the thin plate (the right view of FIG. 4).

In addition, the image display apparatus 10 changes the method for deforming the display target 11 according to the contact vector included in the contact information.

For example, in a case where the contact distance is decreased, the image display apparatus 10 changes the image such that the display target 11 comes near from right and left sides (comes near to a vertical line which passes through the center of the display target 11), and displays the display target. The case is an example in which the change is performed such that the image comes near. Specifically, as being from the right view of FIG. 4 to the left view of FIG. 4 through the central view of FIG. 4, the change is performed such that a peripheral image comes near so as to come near to the vertical line, which passes through the center of the display target 11. In addition, in a case where the contact distance becomes large, the image display apparatus 10 displays the image by changing the image such that the display target 11 is horizontally expanded. The case is an example in which the change is performed such that the image is expanded. Specifically, the image display apparatus 10 changes the image to be expanded from the vertical line, which passes through the center of the display target 11, to the outside, and displays the display target 11. In addition, the image display apparatus 10 performs display by changing a change velocity of enlarging and reducing the display target 11 according to the changing velocity of the distance between the contact positions 12.

In addition, in a case where all the contacts with respect to the touch panel 13 do not exist, that is, the contact positions 12 are not detected, the image display apparatus 10 performs a change of the deformed display target 11 returning to an initial state, and displays the display target 11. In addition, the image display apparatus 10 changes the change velocity of the display target 11 returning to the initial state according to the elasticity value.

Figure 5:
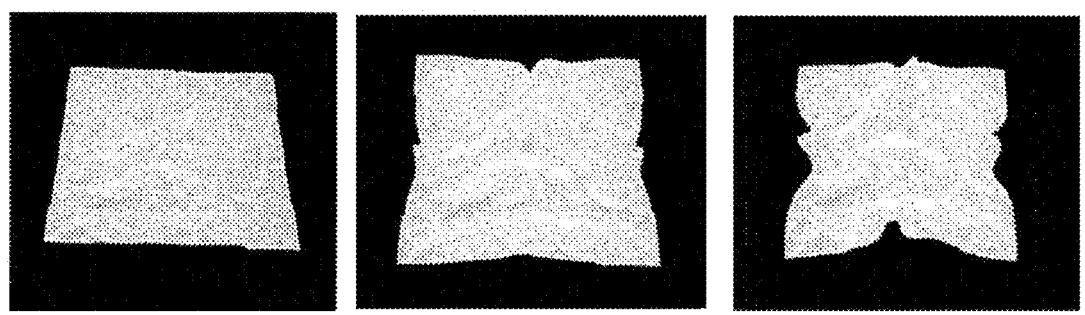
FIG. 5 is an outline diagram illustrating an example of the image display process provided for description in which the display target according to the exemplary embodiment is deformed to be a touched state.

Subsequently, a case of deforming to a touched state will be described with reference to FIG. 5. FIG. 5 is an outline diagram illustrating an example of the image display process provided for description in which the display target according to the exemplary embodiment is deformed to the touched state.

A left view of FIG. 5 expresses a state of being touched to a flexible cloth, a central view of FIG. 5 expresses a state of being touched to a moderate-flexible cloth, and a right view of FIG. 5 expresses a state of being touched to inflexible cloth. Meanwhile, flexibility according to the exemplary embodiment is the buckling load calculated based on the elasticity value. As illustrated in FIG. 5, the image display apparatus 10 deforms the display target 11 according to the buckling load.

For example, in a case where the buckling load is smaller than the first load threshold and the buckling load of the display target 11 is equal to or larger than a fourth load threshold which is smaller than the first load threshold, the image display apparatus 10 deforms the display target 11 to the state of being touched to the flexible cloth (the left view of FIG. 5), and displays the display target 11. In addition, in a case where the buckling load of the display target 11 is smaller than the fourth load threshold and the buckling load, which is smaller than the fourth load threshold, is equal to or larger than a fifth load threshold, the image display apparatus 10 deforms the display target 11 to the state of being touched to the moderate-flexible cloth (the central view of FIG. 5), and displays the display target 11. In addition, in a case where the buckling load of the display target 11 is smaller than the fifth load threshold, the image display apparatus 10 deforms the display target 11 to the state of being touched to the inflexible cloth (the right view of FIG. 5), and displays the display target 11.

That is, as illustrated in FIG. 5, in a case of the same degree of the distance in which the contact positions 12 are moved, a deformation degree of the display target 11 having the large buckling load is small, and the deformation degree of the display target 11 having the small buckling load is large.

In addition, in a case where the spring, the buckling phenomenon, and the like are introduced to models and simulations are performed, it is possible to derive a shape and the amount of change to which the display target 11 is deformed. For example, in a case where the touched state is expressed, the simulation is performed using a wire spring, to which the spring is inserted in a lateral direction, a longitudinal direction, and a diagonal direction of the screen, as a model, and thus it is possible to derive the shape and the amount of change in a case where the display target 11 is deformed to the touched state. In addition, in a case where a pinched state is expressed, the simulation is performed using a hinge spring, in which force acts in a circumferential direction while the contact position 12 is used as a central part of the spring, as the model, and thus it is possible to derive the shape and the amount of change of the display target 11. In addition, in a case where a bent state is expressed, the simulation is performed using the buckling phenomenon as the model, and thus it is possible to derive the shape and the amount of change of the display target 11. In addition, in the case where the simulation is performed using the spring and the buckling phenomenon as the models, resistance force may be introduced to the simulation, together with the spring and the buckling phenomenon.

In the exemplary embodiment, as an example, a form will be described in which the shape, in which the display target 11 is deformed, is acquired by performing the simulation using the buckling phenomenon, in which deflection occurs in a case where the spring and the load using the Hooke's law are added, as the model. Specifically, it is possible to express the spring model in one dimension using the following Equations.

$$F = m_n a \quad (1)$$

$$F = -K(L - L_k) \quad (2)$$

$$L = \sqrt{(X_n - x_n)^2} \quad (3)$$

Here, "F" of Equation (1) indicates force applied to a material point (contact position), "$m_n$" indicates mass of the material point, and "a" indicates an acceleration of the material point. In addition, "k" of Equation (2) indicates a spring coefficient, and "$L_k$" indicates an equilibrium length of the spring. "L" indicates a distance from the material point expressed using Equation (3) to another end of the spring (a central part of the change in the display target 11). "$X_n$" of Equation (3) indicates an x coordinate of another end of the spring, and "$x_n$" indicates an x coordinate of the material point.

In a case where Equation (2) is applied to Equation (3), a result is expressed using the following Equation.

$$a = \frac{-k(L - L_k)}{m_n} \quad (4)$$

In addition, a moving velocity "$V_n+1$" of the material point is expressed using the following Equation.

$$V_{n+1} = V_n + a\Delta t \quad (5)$$

"$V_n$" is a velocity of immediately before the material point, and "$\Delta t$" is micro time applied to a change in coordinates of the material point. Further, a position "$X_n$" of the material point is expressed using the following Equation.

$$X_{n+1} = X_n + V_n \Delta t \quad (6)$$

"$X_n$" is a position of immediately before the material point. In a case where the moving velocity "$V_n+1$" of the material point, which is derived by applying Equation (4) to Equation (5), is applied to Equation (6), it is possible to derive a position "$X_n$" of the material point.

In a case where the above-described spring model is applied to each of the contact positions, it is possible to derive the central position of the change in the display target 11 and the amount of change at the random position of the display target 11. Meanwhile, the spring coefficient "k" and the mass "$m_n$" may be set to random values, or predetermined values may be provided for each display target.

In addition, in the exemplary embodiment, a form is described in which the spring is introduced to the display target 11. However, the form is not limited thereto. The resistance force, which is proportional to a contact position movement velocity, may be introduced. For example, it is possible to express the resistance force using the following Equation.

$$F_r = -dV_n \quad (7)$$

Here, "$F_r$" is the resistance force, and "d" is a resistance (damping) coefficient. In a case where the resistance force is introduced, it is possible to express hardness of the display target 11. For example, even in a case where the contact position movement velocity is identical, the resistance force is reduced and a velocity of the deformation of the display target 11 becomes high with the small damping coefficient "d". In addition, the resistance force increases and the velocity of deforming the display target 11 becomes low with the large damping coefficient. In addition, the above-description is identical to a case where the change of the display target 11 returning to the initial state.

Subsequently, the buckling model will be described. In a case where a one-end fixing model, in which one end of the display target is in contact with a floor and another one end in a state of being lifted up is fixed such that the paper is turned over, is taken into consideration, it is possible to express the buckling model using the following Equation.

Meanwhile, in the exemplary embodiment, a case will be described where the buckling model is applied to a two-dimensional plane in which a direction parallel to the floor, with which the display target is in contact, is set to an x direction and a direction perpendicular to the floor is set to a y direction. In addition, "x" indicates an x coordinate of a random position of the display target 11, and "y" indicates a y coordinate of the random position in a case where the display target 11 is deflected.

$$\frac{d^2y}{dx^2} = \frac{P}{EI}(\delta - y) \qquad (8)$$

$$y = C_1 \sin\alpha x + c_2 \cos\alpha x + \delta \qquad (9)$$

$$\alpha = \sqrt{\frac{P}{EI}} \qquad (10)$$

Here, "P" is the buckling load (axial force), "E" is the Young's modulus, "I" is a sectional two-dimensional moment (difficulty in deformation), and "δ" is a height in a case where the display target 11 is deflected. In addition, "$C_1$" and "$C_2$" are integration constants and are random values which are decided according to a boundary condition given to each model.

In a case where the buckling model in which one end is fixed is taken into consideration, the boundary condition is acquired as in y=0 and dy/dx=0 in a case where x=0, and the integration constants are respectively acquired as in $C_1$=0 and $C_2$=−δ in a case where substitution is performed on Equation (9). In addition, in a case where a height of another end (free point), which is not fixed in a case where the load P is added to the display target, is set to δ, y=δ in a case where x=L. In a case where substitution is performed on Equation (9), cos αL=0 and αL=(2n−1) π. In a case where Equation (10) is substituted with the result, it is possible to express the buckling load P using the following Equation. Meanwhile, "L" is a length of the display target in the x direction, and "n" is a random natural number.

$$P = (2n-1)^2 \frac{\pi^2 EI}{4L^2} \qquad (11)$$

In a case where a minimum value of the buckling load P is taken into consideration, it is possible to Equation 11 is substituted with n=1. Accordingly, it is possible to express the minimum value of the buckling load P using the following Equation.

$$P = \frac{\pi^2 EI}{4L^2} \qquad (12)$$

In addition, in a case where a fact is taken into consideration that the buckling load P is P=σA, it is possible to express the bending stress σ using the following Equation. Meanwhile, "A" indicates a cross-sectional area in a case where the display target 11 is cut by a surface perpendicular to the x direction.

$$\sigma = \frac{\pi^2 E}{4\lambda^2} \qquad (13)$$

$$\lambda = L\sqrt{\frac{A}{I}} \qquad (14)$$

Here, "λ" is a slenderness ratio indicative of slenderness of the display target 11.

In addition, in a case where a both-end fixing model is taken into consideration in which both ends of the display target 11 are in contact with the floor and the both ends are fixed in a state of being deflected at the center of the display target 11, it is possible to express the buckling model using the following Equation.

$$\frac{d^2y}{dx^2} = \frac{1}{E}(Py - M) \qquad (15)$$

$$y = C_1 \sin\alpha x + c_2 \cos\alpha x + \frac{M}{P} \qquad (16)$$

Here, "M" is a bending moment which is resistance against the deflection of the display target. In a case where the buckling model in which both ends are fixed is taken into consideration, the boundary condition is acquired as in y=0 and dy/dx=0 in a case where x=0. In a case where substitution is performed on Equation (9), the integration constants are respectively acquired as in $C_1$=0 and $C_2$=−M/P. In addition, in a case where x=L, y=0. In a case where substitution is performed on Equation (16), cos αL=1 and αL=2nπ. In a case where Equation (10) is substituted with the result, it is possible to express the buckling load P using the following Equation.

$$P = \frac{4n^2\pi^2 EI}{L^2} \qquad (17)$$

In a case where the minimum value of the buckling load P is taken into consideration, it is possible to Equation 11 is substituted with n=1. Accordingly, it is possible to express the minimum value of the buckling load P using the following Equation.

$$P = \frac{4\pi^2 EI}{L^2} \qquad (18)$$

In addition, in a case where a fact is taken into consideration that the buckling load P is P=σA, it is possible to express the bending stress σ using the following Equation.

$$\sigma = \frac{4\pi^2 E}{\lambda^2} \qquad (19)$$

In a case where the above-described buckling model is applied to the display target 11, it is possible to derive the shape of the display target 11 and the amount of change in the random position. Meanwhile, in the exemplary embodiment, the buckling model in which one end is fixed and the buckling model in which both ends are fixed will be described. However, the buckling model is not limited thereto. A buckling model, in which the both ends are not fixed, may be applied. In addition, in the buckling model according to the exemplary embodiment, a model is described in which the load P, which is added to the display target in the x direction, and the bending moment M are taken into consideration. However, the buckling model is not limited thereto. Shear force which is a force that acts in a vertical axial direction with respect to the display target 11 may be applied. In a case where the shear force is applied, it is possible to express a y coordinate of a random position of the display target 11 using the following Equation.

$$y = C_1 \sin \alpha x + c_2 \cos \alpha x + c_3 x \_ c_4 \qquad (20)$$

Here, "$C_3$" and "$C_4$" are integration constants, and are random values which are decided according to the boundary condition given to each model.

Meanwhile, in application of the spring model and the buckling model according to the exemplary embodiment, the buckling load of the display target 11 is calculated using the elasticity value, the spring model is applied in a case where the buckling load is smaller than the first threshold, and the buckling model is applied in a case where the buckling load is equal to or larger than the first load threshold. However, the application is not limited thereto. The spring model and the buckling model may be applied according to the display target 11. For example, in a case where the display target 11 is an elastic object such as paper or a plate, the buckling model may be applied by referring to the Young's modulus. In a case where the display target 11 is an inelastic object such as the soft cloth, the spring model may be applied by referring to the spring coefficient.

Figure 6:
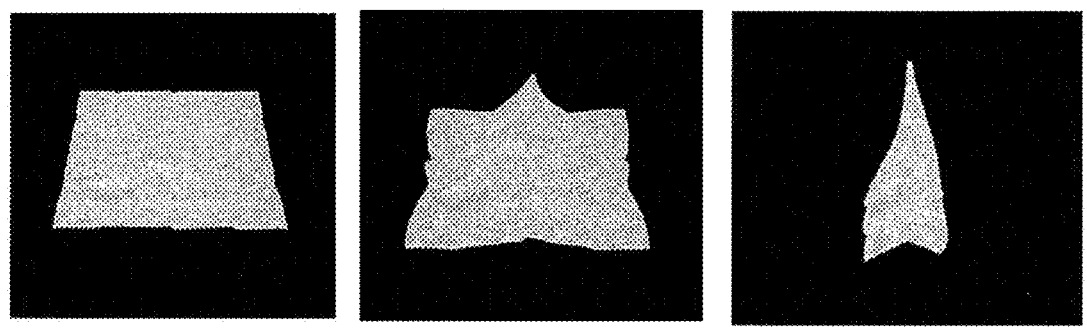
FIG. 6 is an outline diagram illustrating an example of the image display process provided for description in which the display target according to the exemplary embodiment is deformed to be a pinched state.

Subsequently, a case where the display target 11 is deformed to be pinched will be described with reference to FIG. 6. In FIGS. 4 and 5, an example is described in which the display target 11 is deformed by the buckling load calculated based on the elasticity value of the display target 11 and the simulation. In contrast, in FIGS. 6 and 7, an example will be described in which the display target 11 is deformed according to the contact distance and a movement direction of the contact position. FIG. 6 is an outline diagram illustrating an example of the image display process provided for description in which the display target according to the exemplary embodiment is deformed to the pinched state.

In a case where the buckling load is smaller than the first load threshold and the contact distance is smaller than the threshold, the image display apparatus 10 deforms the center of the display target 11 to be raised, and displays the display target 11. A left view of FIG. 6 expresses a state of being touched to a cloth placed on the floor, a central view of the FIG. 6 expresses a state of pinching the cloth placed on the floor, and a right view of FIG. 6 expresses a state of gripping the cloth placed on the floor.

As illustrated in FIG. 6, the image display apparatus 10 deforms the display target 11 according to the contact vector and the contact distance.

For example, in a case where the buckling load is smaller than the first load threshold and the contact distance is changed, the image display apparatus 10 deforms the display target 11 to the state of being touched to the display target (the left view of FIG. 6), and displays the display target 11. In addition, in a case where the buckling load is smaller than the first load threshold and the contact distance is smaller than the threshold of the predetermined contact distance (hereinafter, referred to as a "distance threshold"), the image display apparatus 10 deforms the display target 11 to the state of pinching the display target (the central view of FIG. 6), and displays the display target 11. In addition, in a case where the buckling load is smaller than the first load threshold, the contact distance is smaller than the distance threshold, and the contact positions 12 move in the same direction, the image display apparatus 10 deforms the display target 11 to the state of pinching the display target (the right view of FIG. 6), and displays the display target 11. For example, in a case where the buckling load is smaller than the first load threshold, the contact distance is smaller than a contact threshold, and the contact positions 12 move upward the touch panel 13, the image display apparatus 10 deforms the display target 11 to the state of pinching the display target, and displays the display target 11, as illustrated in the right view of FIG. 6.

Figure 7:
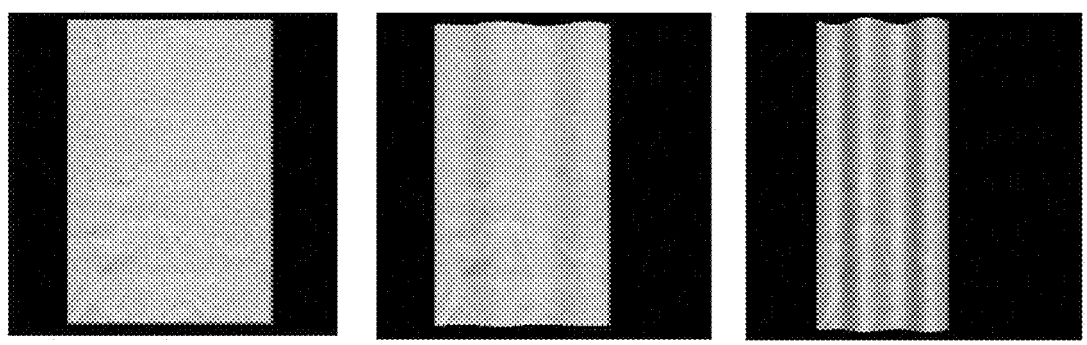
FIG. 7 is an outline diagram illustrating an example of the image display process provided for description in which the display target according to each exemplary embodiment is differently deformed according to a movement direction of a contact position.

Subsequently, a case where the object is deformed to be folded will be described with reference to FIG. 7. FIG. 7 is an outline diagram illustrating an example of the image display process provided for description in which the display target according to the exemplary embodiment is differently deformed according to the movement direction of the contact position.

A left view of FIG. 7 expresses a state before the contact positions are moved, a central view of FIG. 7 expresses a state in which the contact positions are moved to a vicinity of a center of the display target, and a right view of FIG. 7 expresses a state in which the contact positions are moved to one fixed end of the display target.

For example, in a case where the buckling load is equal to or larger than the first load threshold and the contact positions are moved in the identical direction, the image display apparatus 10 fixes the end of the display target 11 on an extension line of the movement direction (hereinafter, referred to as a "fixed position"). In addition, in a case where the buckling load is equal to or larger than the first load threshold and the contact positions are moved in the identical direction, the image display apparatus 10 bends the display target 11 (like curtains) toward the fixed position, and displays the display target 11 (the right view of FIG. 7). In addition, in a state in which the end of the display target 11 is fixed, that is, in a case where all the contact positions are moved in a direction to be separated from the fixed position, that is, the identical direction, the image display apparatus 10 enlarges the display target 11 and displays the display target 11 (the left view of FIG. 7).

Meanwhile, in the exemplary embodiment, a form is described in which the elasticity value is predetermined for each display target 11 and the display target 11 is deformed according to the elasticity value. However, the form is not limited thereto. The display target may be viewed such that a relative position with respect to a virtual light source of the display screen is changed according to a value of the gloss (hereinafter, referred to as a "gloss value") predetermined for each display target 11. In other words, the reflection degree of light of the display target 11 may be changed according to the change. The display target 11 may hardly shine before the display target 11 is changed, and the gloss of the display target 11 may be distinguished according to the deformation of the display target 11 only after the display target 11 is changed. Specifically, in a case where the virtual light source is caused to have an angle instead of a direction perpendicular to the display screen, the display target 11 is deformed, and thus the gloss is distinguished by a tilting part which becomes a three-dimensional part.

That is, the gloss according to the exemplary embodiment may refer to as light which is reflected by the display target 11 and which is changed according to an incident angle, and the gloss value is the reflection degree of light which is changed according to the incident angle. Since the gloss value is set for each display target 11, the gloss value is not changed even in a case where the display target 11 is deformed. However, in a case where the display target 11 is deformed, the incident angle of light with respect to the display target 11 is changed, and thus the reflection degree of light is changed. For example, the image display apparatus 10 assumes a light source which exposes light from one random direction to the display target 11, and displays a state in which light is reflected in the display target 11. The image display apparatus 10 changes the reflection degree of light according to the gloss value for each display target 11. In addition, according to the deformation of the display target 11, the image display apparatus 10 causes the reflection degree of light to be large by causing the gloss to be large before a step viewed from the light source, and causes the reflection degree of light to be small by causing the gloss to be small on a depth side of the step viewed from the light source.

In addition, the exemplary embodiment relates to the spring model and the buckling model according to the buckling load calculated based on the elasticity value.

Figure 8:
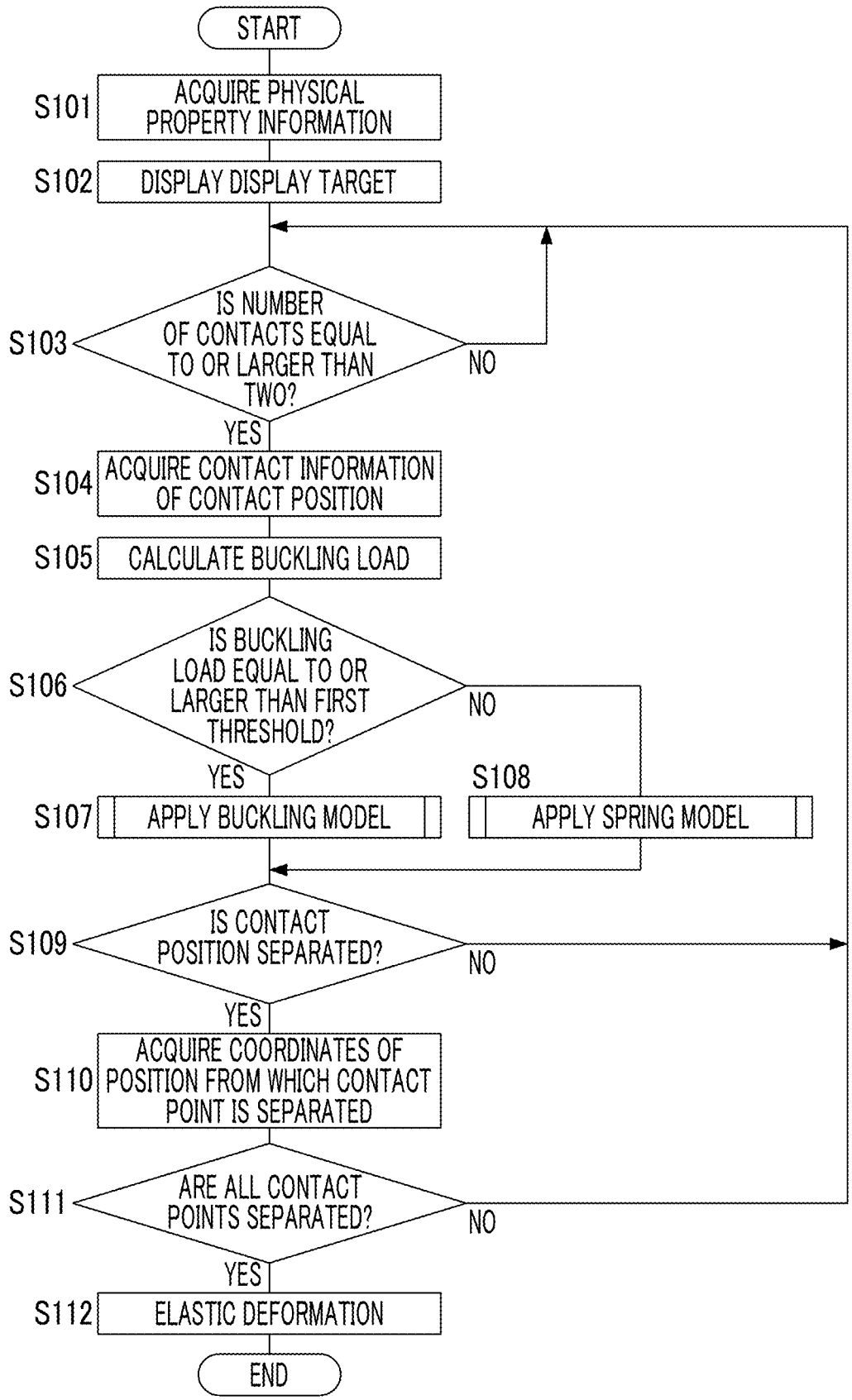
FIG. 8 is a flowchart illustrating an example of the image display process according to a first exemplary embodiment.
Figure 9:
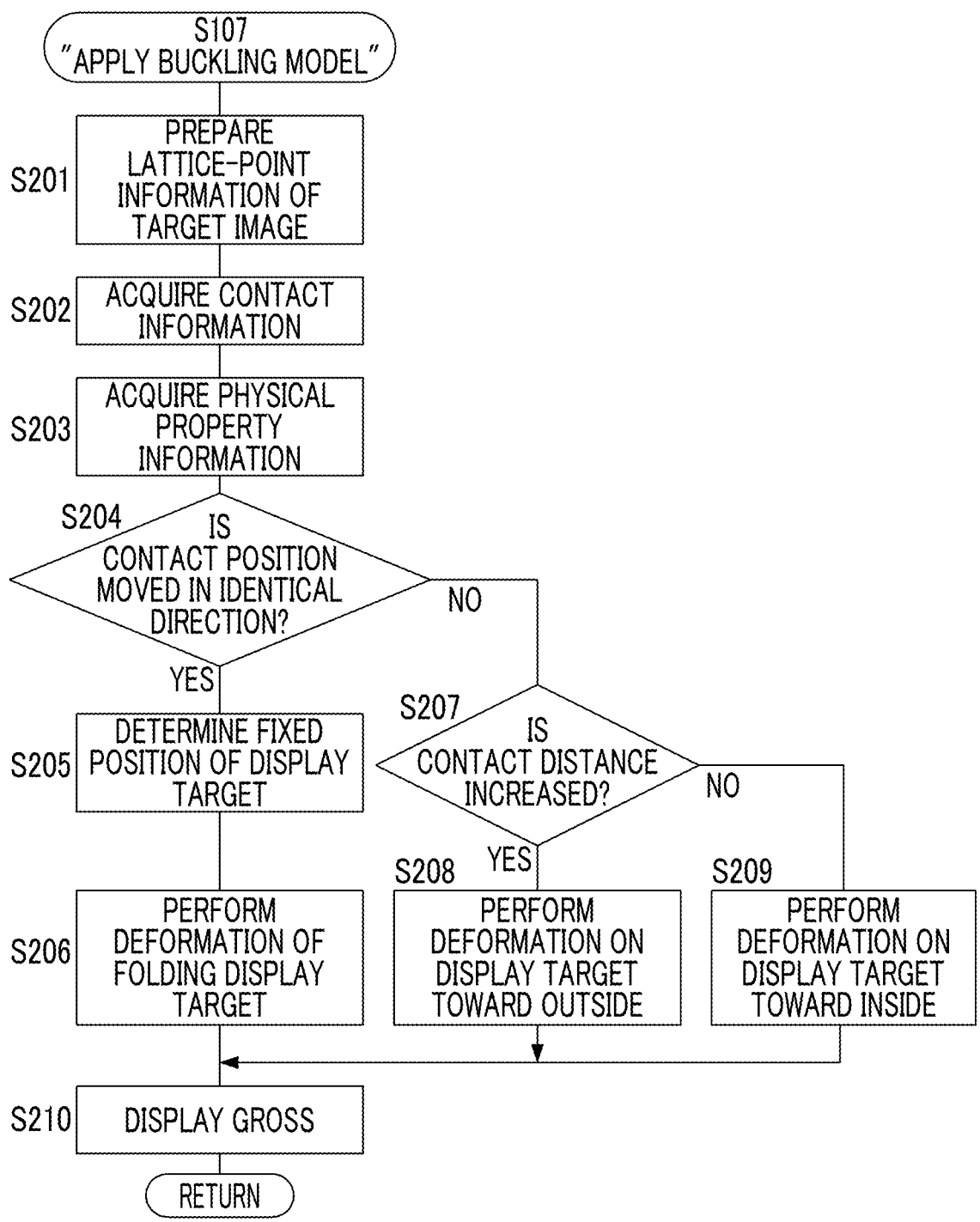
FIG. 9 is a flowchart illustrating an example of a deformation display process using a buckling model according to the first exemplary embodiment.
Figure 10:
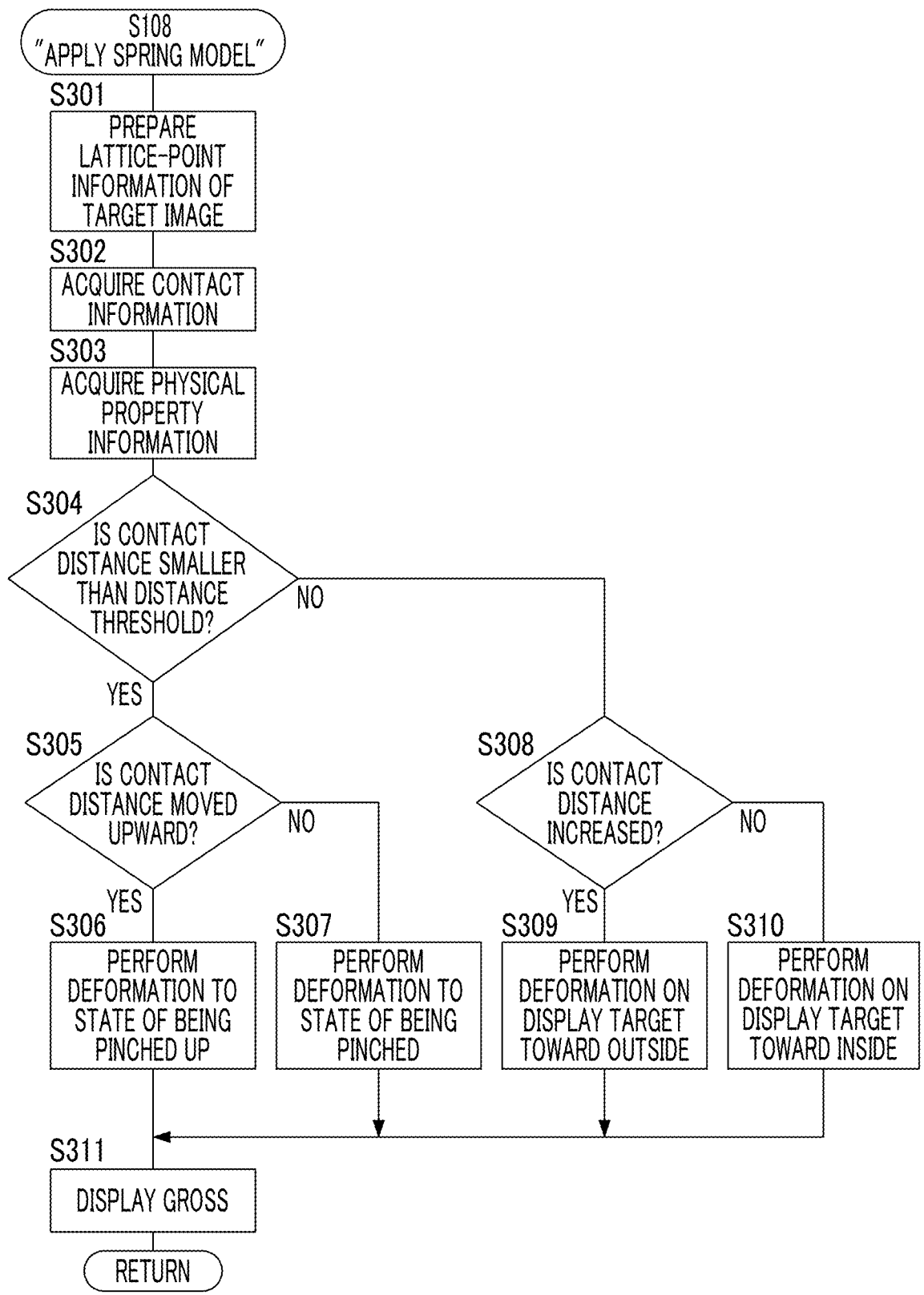
FIG. 10 is a flowchart illustrating an example of a deformation display process using a spring model according to the first exemplary embodiment.

Subsequently, an action of the image display program according to the exemplary embodiment will be described with reference to FIGS. 8, 9, and 10. First, FIG. 8 is a flowchart illustrating an example of the image display process according to the exemplary embodiment. In a case where the CPU 21 reads the image display program from the ROM 22 or the storage 24 and performs the image display program, the image display process illustrated in FIG. 8 is performed. In the image display process illustrated in FIG. 8, in a case where, for example, the user drives the image display apparatus 10, an instruction to execute the image display program is input, and thus the image display process is performed.

In step S101, the CPU 21 acquires the elasticity value and the gloss value which are set for each display target 11.

In step S102, the CPU 21 displays the display target 11 in the initial state on the screen according to the acquired elasticity value and gloss value.

In step S103, the CPU 21 determines whether or not two or more contacts exist. Ina case where the two or more contacts exist (step S103: YES), the CPU 21 proceeds to step S104. In contrast, in a case where the two or more contacts do not exist (step S103: NO), the CPU 21 waits until the two or more contacts exist.

In step S104, the CPU 21 acquires the contact information of the contact positions 12.

In step S105, the CPU 21 calculates the buckling load of the display target 11 using the acquired elasticity value.

In step S106, the CPU 21 determines whether or not the calculated buckling load is equal to or larger than the first threshold. In a case where the buckling load is equal to or larger than the first threshold (step S106: YES), the CPU 21 proceeds to step S107. In contrast, in a case where the buckling load is smaller than the threshold (step S106: NO), the CPU 21 proceeds to step S108.

In step S107, the CPU 21 applies the buckling model, and deforms the display target 11. A deformation display process using the buckling model in step S107 will be described later in detail with reference to FIG. 9.

In step S108, the CPU 21 applies the spring model, and deforms the display target 11. A deformation display process using the spring model in step S108 will be described later in detail with reference to FIG. 10.

In step S109, the CPU 21 determines whether or not the contact position 12 is separated from the touch panel 13. In a case where the contact position 12 is separated from the touch panel 13 (step S109: YES), the CPU 21 proceeds to step S110. In contrast, in a case where the contact position 12 is not separated from the touch panel 13 (step S109: NO), the CPU 21 proceeds to step S103.

In step S110, the CPU 21 acquires coordinates of positions at which the contact positions 12 are separated from the touch panel 13, and registers the acquired coordinates as end point positions in the contact information.

In step S111, the CPU 21 determines whether or not the end point positions are set up in the pieces of contact information of all the contact positions 12. In a case where the end point positions are set up in the pieces of contact information of all the contact positions 12 (step S111: YES), the CPU 21 proceeds to step S112. In a case where the endpoint positions are not set up (step S111: NO), the CPU 21 proceeds to step S103.

In step S112, the CPU 21 performs elastic deformation in a case where power is removed from the display target 11, and displays the display target 11 on the touch panel 13. Meanwhile, the elastic deformation according to the exemplary embodiment is deformation in which the display target 11 tries to return to the original shape. However, the deformation is not limited thereto. In a case where friction, resistance, and elastic limits, and the like due to the floor are taken into consideration, deformation, which remains in a partly deformed state without completely restoring the original to the initial state, may be performed.

In addition, in the exemplary embodiment, a form is described in which the elastic deformation which tries to return to the original is performed in a case where all the contact positions are separated. However, the form is not limited thereto. Even in the case where all the contact positions are separated, the deformation of the display target 11 may remain without performing the elastic deformation, alternatives of whether or not to return to the initial state may be displayed, and return to the initial state may be performed according to selection.

Subsequently, the deformation display process using the buckling model according to the exemplary embodiment will be described with reference to FIG. 9. FIG. 9 is a flowchart illustrating an example of the deformation display process using the buckling model according to the exemplary embodiment. In a case where the CPU 21 reads a buckling model deformation display program from the ROM 22 or the storage 24 and executes the buckling model deformation display program, the deformation display process, which is illustrated in FIG. 9, using the buckling model is performed.

In step S201, the CPU 21 prepares lattice-point information in which the display target 11 is associated with the coordinates, and displays the display target 11.

In step S202, the CPU 21 acquires the contact information touch to the touch panel 13.

In step S203, the CPU 21 acquires the physical property information.

In step S204, the CPU 21 determines whether or not directions in which the respective contact positions are moved are the identical direction. In a case where the respective contact positions are moved in the identical direction (step S204: YES), the CPU 21 proceeds to step S205. In contrast, in a case where the respective contact positions are not moved in the identical direction (step S204: NO), the CPU 21 proceeds to step S207.

In step S205, the CPU 21 determines the end of the display target 11 on an extension line of the direction, in which the contact positions are moved, as the fixed position.

In step S206, the CPU 21 performs deformation of folding the display target 11 toward the fixed position, and displays the display target 11. Meanwhile, the deformation of folding the display target 11 is the deformation of changing the expanded state (for example, the left view of FIG. 7) illustrated in FIG. 7 to a folded and reduced state (for example, the right view of FIG. 7) or changing the folded and reduced state (for example, the right view of FIG. 7) to the expanded state (for example, the left view of FIG. 7). Accordingly, the CPU 21 performs deformation such that a degree of folding the display target 11 is changed according to the direction in which the contact positions are moved, and displays the display target 11.

In step S207, the CPU 21 determines whether or not the contact distance is increased. In a case where the contact distance is increased (step S207: YES), the CPU 21 proceeds to step S208. In contrast, in a case where the contact distance is decreased (step S207: NO), the CPU 21 proceeds to step S209.

In step S208, the CPU 21 performs deformation of spreading out the display target 11 toward an outside of the area surrounded by the contact positions, and displays the display target 11. Meanwhile, the deformation of spreading out the display target 11 is deformation of changing the bent state (for example, the left view of FIG. 4) illustrated in FIG. 4 to a state of returning to an original display state (for example, the right view of FIG. 4). Accordingly, the CPU 21 performs the deformation such that a degree of bending the display target 11 becomes small, and displays the display target 11.

In step S209, the CPU 21 performs deformation of reducing the display target 11 toward an inside of the area surrounded by the contact positions, and displays the display target 11. Meanwhile, as illustrated in FIG. 4, the deformation of reducing the display target is deformation of changing the state (for example, the right view of FIG. 4), in which the deflection of the display target 11 is small, to a state in which the deflection of the display target 11 is large (for example, the left view of FIG. 4). Accordingly, the CPU 21 performs deformation such that the degree of bending the display target 11 is caused to be large, and displays the display target 11.

In step S210, the CPU 21 changes the reflection degree of light of the display target 11 according to the gloss value, and displays the display target 11.

Subsequently, the deformation display process using the spring model according to the exemplary embodiment will be described with reference to FIG. 10. FIG. 10 is a flowchart illustrating an example of the deformation display process using the spring model according to the exemplary embodiment. In a case where the CPU 21 reads the spring model deformation display program from the ROM 22 or the storage 24 and executes the spring model deformation display program, the deformation display process using the spring model illustrated in FIG. 10 is performed.

In step S301, the CPU 21 prepares the lattice-point information in which the display target 11 is associated with the coordinates, and displays the display target 11.

In step S302, the CPU 21 acquires the contact information of the contact positions 12.

In step S303, the CPU 21 acquires the elasticity value and the gloss value.

In step S304, the CPU 21 determines whether or not the contact distance is smaller than the distance threshold. In a case where the contact distance is smaller than the distance threshold (step S304: YES), the CPU 21 proceeds to step S305. In contrast, in a case where the contact distance is equal to or larger than the distance threshold (step S304: NO), the CPU 21 proceeds to step S308.

In step S305, the CPU 21 determines whether or not the contact positions are moved upward. In a case where the contact positions are moved upward (step S305: YES), the CPU 21 proceeds to step S306. In contrast, in a case where the contact positions are not moved upward (step S305: NO), the CPU 21 proceeds to step S307.

In step S306, the CPU 21 performs deformation of reducing the display target 11 toward the area surrounded by the contact positions 12 and lifting the display target 11 upward, that is, deforms the display target 11 to a state of being pinched up toward a determined place, such as a center of the area surrounded by the contact positions (for example, the right view of FIG. 6), and displays the display target 11. It is possible to express the pinched state by applying a hinge spring model.

In step S307, the CPU 21 performs deformation of reducing the display target 11 toward the area surrounded by the contact positions 12, that is, deforms the display target 11 to a state of being pinched toward the determined place, such as the center of the area surrounded by the contact positions (for example, the central view of FIG. 6), and displays the display target 11. It is possible to express the state of being pinched by applying the hinge spring model.

In step S308, the CPU 21 determines whether or not the contact distance is increased. In a case where the contact distance is increased (step S308: YES), the process proceeds to step S309. In contrast, in a case where the contact distance is not increased (step S308: NO), the CPU 21 proceeds to step S310.

In step S309, the CPU 21 performs deformation of spreading out the display target 11 toward the outside of the area surrounded by the contact positions, and displays the display target 11. Meanwhile, here, the deformation of spreading out the display target 11 is deformation of changing the touched state (for example, the right view of FIG. 5) illustrated in FIG. 5 to the state of returning to the original display state (for example, the left view of FIG. 5). Accordingly, the CPU 21 performs deformation such that a degree of touch of the display target 11 becomes small, and displays the display target 11.

In step S310, the CPU 21 performs deformation of reducing the display target 11 toward the inside of the area surrounded by the contact positions, and displays the display target 11. Meanwhile, as illustrated in FIG. 5, the deformation of reducing the display target 11 is deformation of changing the state (for example, the left view of FIG. 5), in which the display target 11 is not touched, to the touched state (for example, the right view of FIG. 5). Accordingly, the CPU 21 performs deformation such that the degree of touch of the display target 11 is caused to be large, and displays the display target 11.

In step S311, the CPU 21 changes the reflection degree of light of the display target 11 according to the deformation of the display target 11, and displays the display target 11.

Meanwhile, in the exemplary embodiment, a form is described in which the method for deforming the display target 11 is changed according to the contact distance. However, the form is not limited thereto. The display target 11 may be deformed according to the area surrounded by the plurality of contact positions 12. In addition, in the exemplary embodiment, the form is described in which the buckling model is applied in a case where the buckling load is equal to or larger than the first load threshold. However, the form is not limited thereto. The buckling model may be applied according to the movement of the contact position.

For example, in a case where two contact positions exist and the both contact positions are moved from initial contact positions, the both-end fixing model is applied. In a case where one contact position is moved from the initial contact position and another contact position is not moved from the initial contact position, the one-end fixing model may be applied.

In addition, in the exemplary embodiment, a form is described in which, in a case where the contact distance is increased, deformation of returning from the touched state to the original display is performed. However, the form is not limited thereto. In a case where the contact distance is increased, deformation of expanding the display target 11 toward the outside from the area surrounded by the contact positions may be performed.

As described above, according to the exemplary embodiment, control is performed to change content of deforming the display target according to the buckling load calculated based on the elasticity value and the vector in which the contact positions are moved due to the contacts. Accordingly, it is possible to perform various operations with respect to the image of the object displayed on the display screen.

Second Exemplary Embodiment

In the first exemplary embodiment, a form is described in which the number of contact positions 12 is fixed and the method for deforming the display target 11 is changed according to the movement vector of the contact positions 12. In a second exemplary embodiment, a form is described in which the method for deforming the display target 11 (content to be deformed) is changed according to the number of the contact positions 12. Meanwhile, a configuration (refer to FIG. 1) of an image display apparatus 10 according to the exemplary embodiment, a hardware configuration (refer to FIG. 2) of the image display apparatus 10, and a functional configuration (refer to FIG. 3) of the image display apparatus 10 are the same as in the first exemplary embodiment, and thus description thereof will not be repeated. In addition, outline diagrams (refer to FIGS. 4, 5, 6, and 7) provided for description of an image display process according to the exemplary embodiment, a flowchart (refer to FIG. 9) of a deformation display process using a buckling model, a flowchart (refer to FIG. 10) of a deformation display process using a spring model are the same as in the first exemplary embodiment, and thus description thereof will not be repeated.

First, the functional configuration of the image display apparatus 10 will be described with reference to FIG. 3. In the second exemplary embodiment, a function of the control unit 105 is different from the function in the first exemplary embodiment. Accordingly, only the control unit 105 will be described.

The control unit 105 performs control to change content for deforming the display target 11 according to the number of contacts with respect to the display screen and the vector in which the contact positions based on the contacts are moved. The control unit 105 performs the control by, for example, the following aspect.

In a case where the number of contacts with respect to the display screen is two and the contact positions are moved such that the distance between the contact positions based on the two contacts is decreased or increased, the control unit 105 performs a process of not deforming the display target 11. Specifically, the display is reduced or enlarged without deforming the display target 11.

In contrast, in a case where the number of contacts with respect to the display screen is three and the contact positions are moved such that the distance between the contact positions based on the three contacts is decreased or increased, the control unit 105 performs a process of deforming the display target 11. Specifically, the display target 11 is deformed about a part in an area surrounded by the three contacts. In addition, in a case where the contact positions are moved such that the distance between the contact positions based on the three contacts is decreased, the control unit 105 deforms the display target 11 by causing the image to come near to a prescribed place in the area such that the display target 11 is pinched in the area surrounded by three contacts. In addition, in a case where the contact positions are moved such that the distance between the contact positions by the three contacts is expanded, the control unit 105 deforms the display target by expanding the image from the inside of the area such that the display target is spread out from the area surrounded by the three contacts.

In addition, in a case where a plurality of contact positions based on a plurality of contacts are moved in a first direction which is the same direction, the control unit 105 deforms the display target 11 such that an area surrounded by the plurality of contact positions slides toward an end part of the display target 11 which exists at a front side of the first direction.

In addition, the control unit 105 changes a method for deforming the display target 11 according to physical properties of an object. In addition, the control unit 105 changes the amount of deformation of the display target 11 according to the physical properties. In addition, the control unit 105 changes a deformation velocity in a case where the display target is deformed according to the physical properties. In addition, the control unit 105 changes the display target in different forms according to the physical properties.

In addition, the higher elasticity of the display target 11, the control unit 105 causes a velocity of returning to an original shape to be faster after the display target 11 is deformed. In addition, the higher glossiness of the display target 11, the control unit 105 causes the amount of change in a reflection degree of light to be larger in a case where the display target 11 is deformed. In addition, the control unit 105 changes the reflection degree after the display target 11 is deformed. In addition, the control unit 105 changes display of the display target 11 according to texture. The control unit 105 changes a behavior in a case where the display target 11 is deformed according to the texture. Meanwhile, in the present exemplary embodiment, a form is described in which, the higher the elasticity, the velocity of returning to the original shape is faster. However, the form is not limited thereto. The physical properties to be referred to may be switched according to the display target 11. For example, in a case where the display target 11 is an elastic object such as paper, Young's modulus may be referred to. In a case where the display target 11 is an inelastic object such as a soft cloth, a spring coefficient may be referred to.

Figure 11:
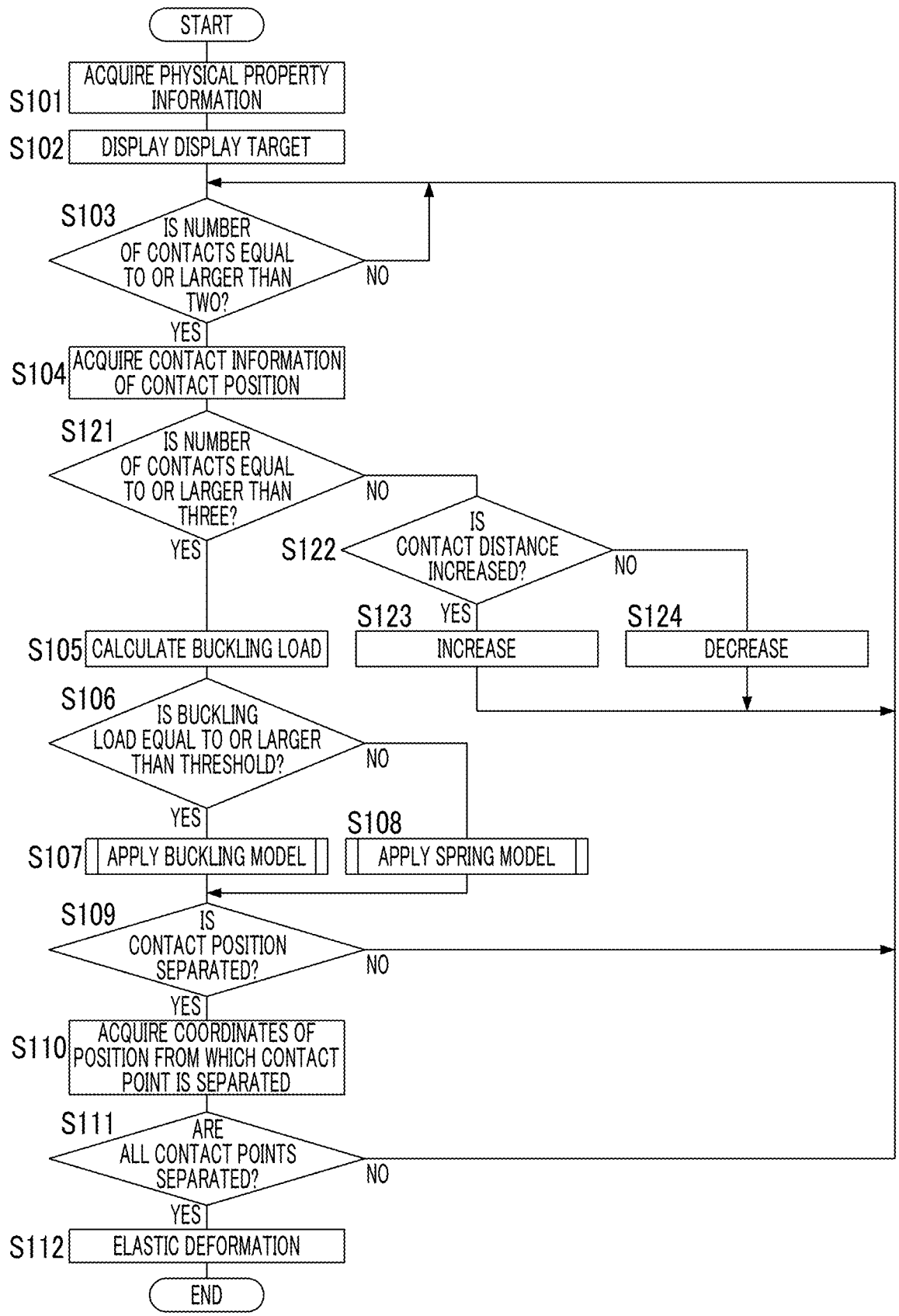
FIG. 11 is a flowchart illustrating an example of an image display process according to a second exemplary embodiment.

Subsequently, an action of an image display program according to the exemplary embodiment will be described with reference to FIG. 11. First, FIG. 11 is a flowchart illustrating an example of the image display process according to the exemplary embodiment. In a case where a CPU 21 reads the image display program from a ROM 22 or a storage 24 and executes the image display program, the image display process illustrated in FIG. 11 is performed. In the image display process illustrated in FIG. 11, for example, in a case where the user drives the image display apparatus 10, an instruction to execute the image display program is input, and thus the image display process is performed. Meanwhile, in FIG. 11, the identical reference symbols as in FIG. 8 are attached to components which are identical to the functions of the image display apparatus 10 illustrated in FIG. 8, and the description thereof will not be repeated.

In step S121, the CPU 21 determines whether or not the number of contact positions 12 is equal to or larger than three. In a case where the number of contact positions 12 is equal to or larger than three (step S121: YES), the CPU 21 proceeds to step S105. In contrast, in a case where the number of contact positions 12 is two (step S121: NO), the CPU 21 proceeds to step S122.

In step S122, the CPU 21 determines whether or not a contact distance between the two contact positions is increased. In a case where the contact distance is increased (step S122: YES), the CPU 21 proceeds to step S123. In contrast, in a case where the contact distance is decreased (step S122: NO), the CPU 21 proceeds to step S124.

In step S123, the CPU 21 enlarges and displays the display target 11 without deforming the display target 11.

In step S124, the CPU 21 reduces and displays the display target 11 without deforming the display target 11.

Meanwhile, in the exemplary embodiment, a form is described in which the display target 11 is enlarged or reduced without deforming the display target 11 in a case where the number of contact positions is two, and the display target 11 is deformed in a case where the number of contact positions is three. However, the form is not limited thereto. The deformation of the display target 11 may be restricted according to the number of contact positions. The control unit 105 performs the control by, for example, the following aspect.

In a case where the number of contacts with respect to the display screen is two and contact positions are moved such that the distance between the contact positions is decreased or increased, the control unit 105 deforms the display target 11. Specifically, in a case where the contact positions are moved such that the distance between the contact positions is decreased, the control unit 105 deforms the display target 11 to be pinched or to come near to the center of the contact position. Ina case where the contact positions are moved such that the distance is separated, the control unit 105 deforms the display target 11 to be spread out. In contrast, in a case where the number of contact positions with respect to the display screen is equal to or larger than three, the control unit 105 restricts deformation of the display target 11. Specifically, in a case where the contact positions are moved such that the distance between the contact positions is decreased, the control unit 105 deforms the display target 11. In a case where the contact positions are moved such that the distance is expanded, the control unit 105 does not deform the display target 11. That is, in a case where the number of contact positions is three and the contact positions are moved such that the distance between the contact positions is expanded, the deformation of the display target 11 is restricted. Meanwhile, the above description is an example of restriction of the deformation of the display target 11 based on the number of contact positions. Any restriction may be applied. For example, in a case where the contact positions are moved such that the distance between the contact positions is decreased, the deformation of the display target 11 may be restricted. In addition, for example, in a case where the number of contact positions is two, the restriction may not be performed. In a case where the number of contact positions is four, the restriction may be performed only in a case where the distance between the contact positions is expanded.

In addition, in the exemplary embodiment, a form is described in which the display target 11 is reduced or enlarged in the case where the number of contact positions is two and the display target 11 is deformed in the case where the number of contact positions is three. However, the form is not limited thereto. Switching may be performed between deformation, enlargement, and reduction according to the number of contact positions as in the cases where the display target 11 is deformed in the case where the number of contact positions is two and the display target 11 is reduced or enlarged in the case where the number of contact positions is two.

As described above, according to the exemplary embodiment, it is possible to acquire the same advantages as in the first exemplary embodiment.

Third Exemplary Embodiment

In the second exemplary embodiment, the form is described in which the method for deforming the display target 11 is changed according to the number of contact positions. In the exemplary embodiment, a form is described in which a behavior is changed in a case where the display target 11 is deformed according to the coordinates of the contact positions 12. Meanwhile, a configuration (refer to FIG. 1) of an image display apparatus 10 according to the exemplary embodiment, a hardware configuration (refer to FIG. 2) of the image display apparatus 10, and a functional configuration (refer to FIG. 3) of the image display apparatus 10 are the same as in the first exemplary embodiment, and thus description thereof will not be repeated. In addition, outline diagrams (refer to FIGS. 4, 5, 6, and 7) provided for description of an image display process according to the exemplary embodiment, a flowchart (refer to FIG. 9) of a deformation display process using a buckling model, a flowchart (refer to FIG. 10) of a deformation display process using a spring model are the same as in the first exemplary embodiment, and thus description thereof will not be repeated.

Figure 12:
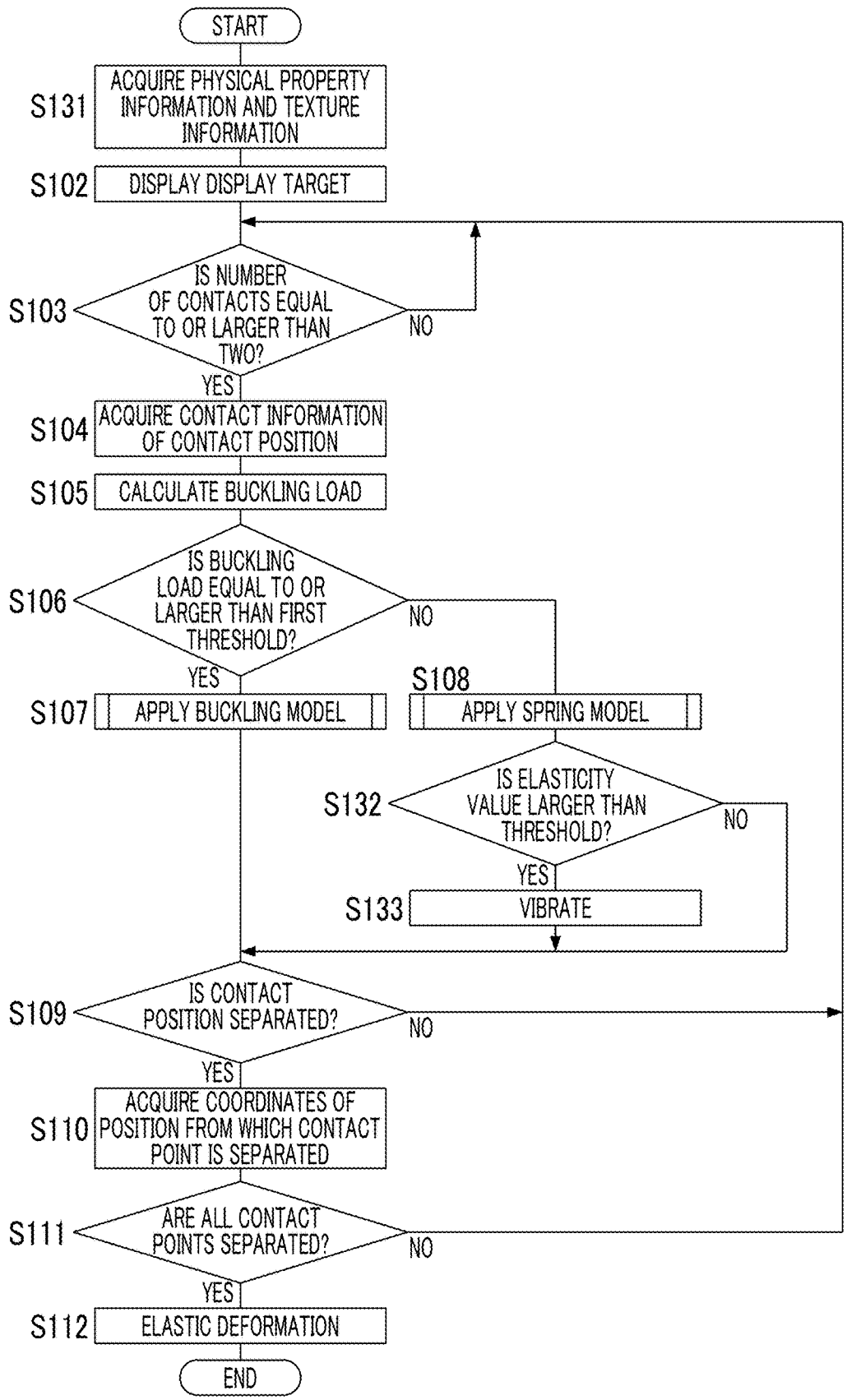
FIG. 12 is a flowchart illustrating an example of an image display process according to a third exemplary embodiment.

An action of an image display program according to the exemplary embodiment will be described with reference to FIG. 12. First, FIG. 12 is a flowchart illustrating an example of an image display process according to a third exemplary embodiment. In a case where a CPU 21 reads the image display program from a ROM 22 or a storage 24 and executes the image display program, the image display process illustrated in FIG. 12 is performed. In the image display process illustrated in FIG. 12, for example, in a case where a user drives the image display apparatus 10, an instruction to execute the image display program is input, and thus the image display process is performed. Meanwhile, in FIG. 12, the identical reference symbols as in FIG. 8 are attached to components which are identical to the functions of the image display apparatus 10 illustrated in FIG. 8, and the description thereof will not be repeated.

In step S131, the CPU 21 acquires an elasticity value, a gloss value, and texture information which are set for each display target 11.

In step S132, the CPU 21 determines a size of the elasticity value included in the texture information. In a case where the elasticity value included in the texture information is equal to or larger than a threshold (step S132: YES), the CPU 21 proceeds to step S133. In contrast, in a case where the elasticity value included in the texture information is smaller than the threshold (step S132: NO), the CPU 21 proceeds to step S109.

In step S133, the CPU 21 drives and vibrates a vibration unit 106. For example, the CPU 21 reproduces elasticity and vibration, which are transmitted to a finger of the user in a case where contact positions 12 are changed, using the vibration unit 106.

As described above, according to the exemplary embodiment, in addition to the advantages which are the same as in the first exemplary embodiment and the second exemplary embodiment, it is possible to reproduce texture which allows to feel the elasticity through vibration in a case of a pinching motion in a case where the elasticity value is equal to or larger than the threshold.

In addition thereto, a configuration of the image display apparatus described in the exemplary embodiment is an example, and may be changed according to a situation in a scope without departing from the gist.

In addition, a flow of the process of the program described in the exemplary embodiment is also an example. An unnecessary step may be removed, a new step may be added, or a process order may be switched in the scope without departing from the gist.

Meanwhile, the image display process, which is executed in such a way that the CPU reads software (program) in the above exemplary embodiment, may be executed by various processors other than the CPU. In this case, a Programmable Logic Device (PLD), in which it is possible to change a circuit configuration after manufacturing a Field Programmable Gate Array (FPGA) or the like, a dedicated electronic circuit, such as an Application Specific Integrated Circuit (ASIC), which is a processor having a circuit configuration dedicatedly designed to perform a specific process, and the like are exemplified as the processor. In addition, the image display process may be performed by one of the various processors or may be performed by a combination (for example, an example which includes a GPU, a combination of a plurality of FPGAs, the CPU, and the FPGA, and the like) of two or more processors of the same or different types. In addition, more specifically, a hardware structure of the various types of processors is an electronic circuit acquired by combining circuit elements such as semiconductor elements.

In addition, in the above exemplary embodiment, an aspect is described in which the program of the image display process is previously stored (installed) in the storage 24. However, the aspect is not limited thereto. The program may be provided in a form of being stored in a recording medium such as a Compact Disk Read Only Memory (CD-ROM), a Digital Versatile Disk Read Only Memory (DVD-ROM), and a Universal Serial Bus (USB) memory. In addition, a form may be provided in which the program is downloaded from an external apparatus through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display apparatus comprising:
a display screen that displays an image indicative of an object as a display target; and
a processor that performs control to change content of deforming the display target according to the number of contacts with respect to the display screen, a vector in which contact positions based on the contacts are moved, and information relevant to physical properties of the object indicated by the display target,
wherein the processor:
acquires the information relevant to the physical properties of the object,
calculates buckling load using the information relevant to the physical properties of the object,
determines a method of deforming the display target according to the buckling load,
performs deformation on the display target according to the method of deforming, and
performs elastic deformation of returning to an original shape on the display target.

2. The image display apparatus according to claim 1, wherein the processor does not deform the display target in a case where the number of contacts with respect to the display screen is two, and deforms the display target in a case where the number of contacts with respect to the display screen is equal to or larger than three.

3. The image display apparatus according to claim 2, wherein the processor
reduces or enlarges the display target in a case where the number of contacts with respect to the display screen is two and a distance between the contact positions based on the two contacts is changed, and
deforms the display target about a part in an area surrounded by three contacts in a case where the number of contacts with respect to the display screen is three and a distance between the contact positions based on the three contacts is changed.

4. The image display apparatus according to claim 3, wherein the processor deforms the display target by causing the image to come near to a prescribed place in an area surrounded by three contacts in a case where the number of contacts with respect to the display screen is three and the contact positions are moved such that the distance between the contact positions based on the three contacts is decreased.

5. The image display apparatus according to claim 3, wherein the processor deforms the display target by expanding the image from an inside of an area surrounded by the three contacts in a case where the number of contacts with respect to the display screen is three and the contact positions are moved such that the distance between the contact positions based on the three contacts is increased.

6. The image display apparatus according to claim 1, wherein the processor
deforms the display target in a case where the number of contacts with respect to the display screen is two and contact positions are moved such that a distance between the contact positions is decreased or increased, and
deforms the display target in a case where the number of contacts with respect to the display screen is equal to or larger than three and the contact positions are moved such that the distance between the contact positions is decreased, and does not deform the display target in a case where the number of contacts with respect to the display screen is equal to or larger than three and the contact positions are moved such that the distance between the contact positions is increased.

7. The image display apparatus according to claim 1, wherein the processor reduces or enlarges the display target in a case where the number of contacts with respect to the display screen is two and a distance between the contact positions based on the two contacts is changed, and deforms the display target about a part in an area surrounded by three contacts in a case where the number of contacts with respect to the display screen is three and a distance between the contact positions based on the three contacts is changed.

8. The image display apparatus according to claim 7, wherein the processor deforms the display target by causing the image to come near to a prescribed place in an area surrounded by three contacts in a case where the number of contacts with respect to the display screen is three and the contact positions are moved such that the distance between the contact positions based on the three contacts is decreased.

9. The image display apparatus according to claim 7, wherein the processor deforms the display target by expanding the image from an inside of an area surrounded by three contacts in a case where the number of contacts with respect to the display screen is three and the contact positions are moved such that the distance between the contact positions based on the three contacts is increased.

10. The image display apparatus according to claim 1, wherein the processor deforms the display target such that an area, which is surrounded by a plurality of contact positions, slides toward an end of the display target which exists at a front side of a first direction in a case where a plurality of contacts exist with respect to the display screen and the plurality of contact positions based on the plurality of contacts are moved in the first direction which is the same direction.

11. The image display apparatus according to claim 1, wherein the processor changes a method of deforming the display target according to the physical properties of the object.

12. The image display apparatus according to claim 11, wherein the processor changes an amount of deformation of the display target according to the physical properties.

13. The image display apparatus according to claim 11, wherein the processor changes a deformation velocity in a case where the display target is deformed according to the physical properties.

14. The image display apparatus according to claim 11, wherein the processor changes the display target in different forms according to the physical properties.

15. The image display apparatus according to claim 11, wherein one of the physical properties is elasticity, and wherein the processor causes a velocity of returning to an original shape after the display target is deformed to be faster as the elasticity of the display target is higher.

16. The image display apparatus according to claim 11, wherein one of the physical properties is a gloss, and wherein the processor causes a reflection degree of light in a case where the display target is deformed to be larger as glossiness of the display target is higher.

17. The image display apparatus according to claim 16, wherein the processor changes the reflection degree of light according to deformation of the display target.

18. The image display apparatus according to claim 1, wherein the processor that acquires information relevant to texture, which is one of the physical properties of the display target, of a surface of the display target, wherein the processor changes a behavior in a case where the display target is deformed according to the texture.

19. An image display apparatus comprising:

a display screen that displays an image indicative of an object as a display target; and a processor that reduces or enlarges the display target without deforming the display target according to a vector, in which contact positions are moved, in a case where the number of contacts with respect to the display screen is two, and that deforms the display target about a part in an area surrounded by the contact positions according to a vector, in which the contact positions are moved, in a case where the number of contacts with respect to the display screen is equal to or larger than three, wherein the processor:

acquires information relevant to physical properties of the object, calculates buckling load using the information relevant to the physical properties of the object, determines a method of deforming the display target according to the buckling load, performs deformation on the display target according to the method of deforming, and performs elastic deformation of returning to an original shape on the display target.

20. A non-transitory computer readable medium storing an image display program causing a computer to execute a process comprising:

displaying an image indicative of an object as a display target; and performing control to change content of deforming the display target according to the number of contacts with respect to a display screen, which displays the image indicative of the object as the display target, a vector in which contact positions based on the contacts are moved, and information relevant to physical properties of the object indicated by the display target, wherein the procedure of performing control to change the content of deforming the display target comprises:

acquires the information relevant to the physical properties of the object, calculates buckling load using the information relevant to the physical properties of the object, determines a method of deforming the display target according to the buckling load, performs deformation on the display target according to the method of deforming, and performs elastic deformation of returning to an original shape on the display target.

* * * * *